United States Patent
Cardarelli

(10) Patent No.: US 7,769,852 B2
(45) Date of Patent: Aug. 3, 2010

(54) DETECTION AND NOTIFICATION OF NETWORK-RELATED EVENTS

(75) Inventor: John N Cardarelli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 11/549,572

(22) Filed: Oct. 13, 2006

(65) Prior Publication Data

US 2008/0091791 A1    Apr. 17, 2008

(51) Int. Cl.
*G06F 15/16* (2006.01)
(52) U.S. Cl. .................................... 709/224
(58) Field of Classification Search ............ 709/217, 709/224
See application file for complete search history.

(56) References Cited

U.S. PATENT DOCUMENTS

| | | | |
|---|---|---|---|
| 2003/0218631 A1* | 11/2003 | Malik | 345/739 |
| 2004/0248560 A1* | 12/2004 | Bedingfield et al. | 455/412.2 |
| 2005/0038893 A1* | 2/2005 | Graham | 709/228 |
| 2005/0193079 A1* | 9/2005 | Brown et al. | 709/207 |
| 2006/0221184 A1* | 10/2006 | Vallone et al. | 348/155 |
| 2006/0288417 A1* | 12/2006 | Bookbinder et al. | 726/24 |
| 2007/0124458 A1* | 5/2007 | Kumar | 709/224 |
| 2007/0230385 A1* | 10/2007 | Gaw | 370/310.2 |
| 2008/0009267 A1* | 1/2008 | Ramos Robles et al. | 455/411 |

\* cited by examiner

*Primary Examiner*—Wing F Chan
*Assistant Examiner*—Tesfay Yohannes
(74) *Attorney, Agent, or Firm*—Merchant & Gould PC

(57) ABSTRACT

Systems, methods, and/or techniques ("tools") that relate to detecting network-related events and providing notification of the same are described herein. In different implementations, the tools may receive indications of network accesses from users who are remote from a given machine. In response to the indications, the tools may provide notifications of these network accesses to a user who is associated with the given machine.

20 Claims, 6 Drawing Sheets

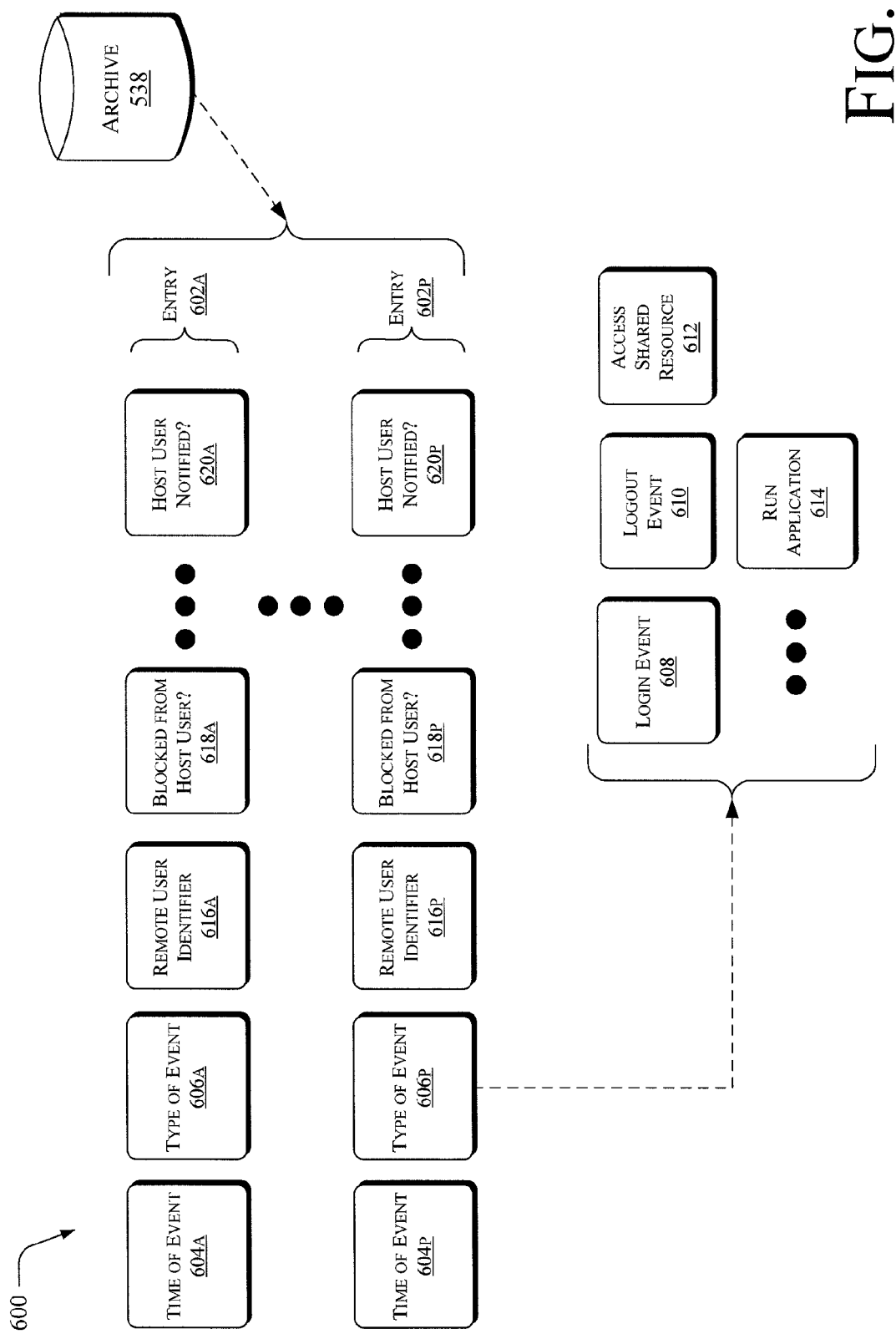

DETECTION AND NOTIFICATION OF NETWORK-RELATED EVENTS

BACKGROUND

As networks and related access technologies continue to proliferate, desktop workstations and servers are increasingly accessible over a variety of different networks. For example, desktop personal computers (PCs) may be configured to allow remote users to login over a network and access the PC.

While these remote access techniques may offer advantages, they also raise issues. For example, remote users may consume the resources of the system to which they are logged in, degrading overall performance of the system. In some instances, remote users may be malicious, and attempt to undermine the system to which they are logged. In other instances, the remote users may, at some times, be a nuisance to the operator of the system, and the operator may wish to deny access to the remote users at these times.

In light of these issues, opportunities exist for further improvement of remote access techniques. More specifically, users of systems to which remote users may connect may wish to monitor those persons who have remotely logged in to the system.

SUMMARY

Systems, methods, and/or techniques ("tools") that relate to detecting network-related events and providing notification of the same are described herein. In different implementations, the tools may receive indications of network accesses from users who are remote from a given machine. In response to the indications, the tools may provide notifications of these network accesses to a user who is associated with the given machine.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to an automated service for blocking malware hosts are described in connection with the following drawing figures. The same numbers are used throughout the disclosure and figures to reference like components and features. The first digit in a reference number indicates the drawing figure in which that reference number is introduced.

FIG. 6 illustrates examples of entries and fields, collectively 600, that may be stored in an archive that is written in the course of detecting network-related events and providing notifications of the same.

DETAILED DESCRIPTION

Overview

The following document describes tools capable of performing and/or supporting many techniques and processes. The following discussion describes exemplary ways in which the tools provide for detecting network-related events and providing notifications of the same. This discussion also describes other techniques and/or processes that may be performed by the tools.

Figure 1:
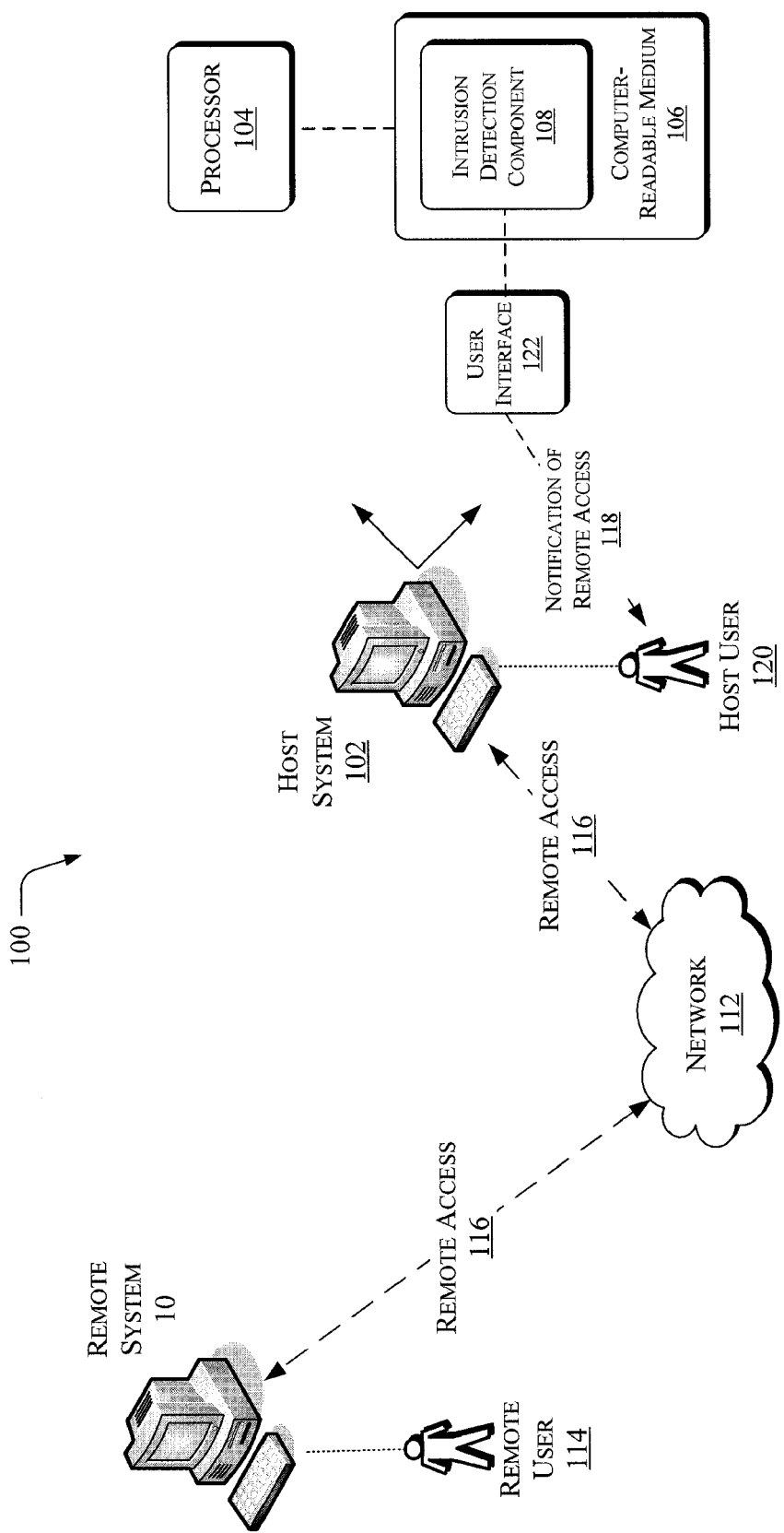
FIG. 1 is a combined block and flow diagram of an operating environment suitable for implementing detection and notification of network-related events.

FIG. 1 is a combined block and flow diagram of an operating environment 100 suitable for implementing detection and notification of network-related events. The operating environment 100 may include one or more host system 102. It is understood that implementations of the operating environment may include any number of different host system, although FIG. 1 shows one host system only for convenience of illustration.

In general, the host system 102 may be computer-based systems that include one or more processor(s) 104 and one or more instances of computer-readable storage media 106. The computer-readable media may contain instructions that, when executed by the processor, perform any of the tools or related functions as described herein. The processor may be configured to access and/or execute the instructions embedded or encoded onto the computer-readable media. The processor may also be categorized or characterized as having a given architecture. The host system may include computing devices, such as a network server or other server, a desktop computer, a laptop or notebook computer, or any other computing device configured to perform the functions described herein in connection with the host system.

The computer-readable media 106 may include one or more instances of intrusion detection components 108. FIG. 1 shows one instance of the intrusion detection component for convenience only. The intrusion detection components may be implemented as one or more software modules. For example, the intrusion detection components may be integrated into operating system software running on the host system, or may be a standalone component plugged into the host system. In other implementations, the intrusion detection components may be included in an application or utility that protects the host system from malware and/or spyware. An example of such a utility is the WINDOWS® DEFENDER™ product available from Microsoft Corporation of Redmond, Wash.

The host system 102 may be configured to allow one or more remote systems 110 to access the host system over an intermediate network 112. The intermediate network 112 may be configured in any convenient fashion, and may include one or more local area networks (LANs) or wide area networks (WANs). For example, a remote user 114 may use the remote system 110 to log into the host system. Having done so, the remote user may access files or other shared resources on the host system, run applications on the host system, or perform any other function that the host system supports for remote users.

FIG. 1 represents these remote accesses generally at 116. When instances of these remote accesses occur, the intrusion detection component 108 may detect these accesses, as detailed further as this description proceeds. In response to at least some of these accesses, the intrusion detection component may generate notifications of these remote accesses, denoted generally at 118.

A user 120 may be associated with the host system 102, and may receive the notifications 118 via a user interface 122 provided by the host system. For example, assuming the operating environment 100 is deployed in a corporate or enterprise scenario, the user 120 may be assigned to the host system 102, such that the user 120 has some measure of responsibility or authority over the host system. In another example, the operating environment 100 may be deployed in a home usage scenario, with the user 120 assuming perhaps an administrative role over the host system.

Figure 2:
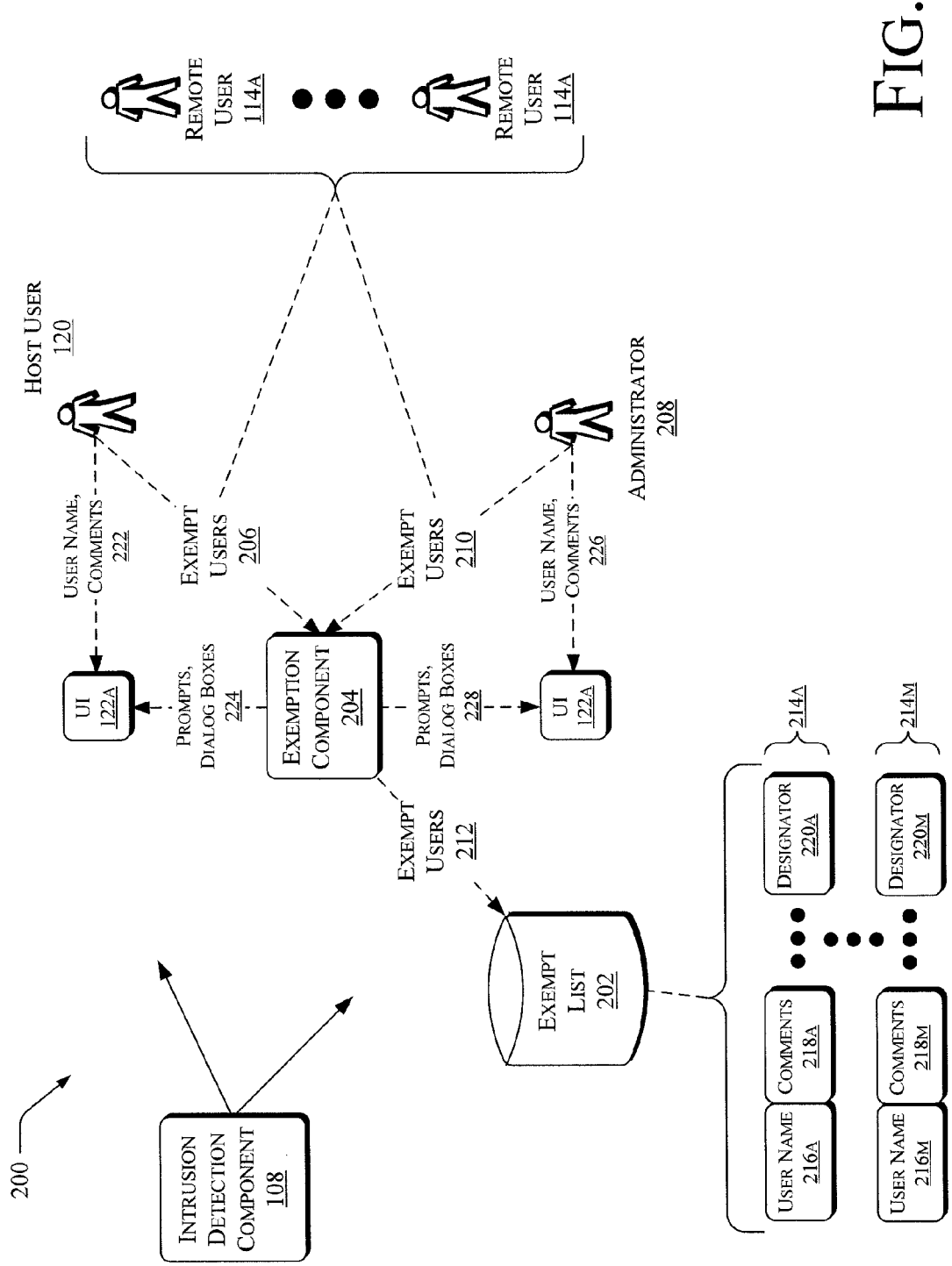
FIG. 2 is a combined block and flow diagram illustrating components and data flows related to an intrusion detection component provided by the operating environment shown in FIG. 1, pertaining to implementing an exemption list.

Having described the operating environment 100 in FIG. 1, the discussion now turns to a more detailed description of the intrusion detection component 108, now presented with FIG. 2.

FIG. 2 illustrates components and data flows 200 related to the intrusion detection component 108 provided by the operating environment shown in FIG. 1. More specifically, FIG. 2 illustrates components and data flows relating to an exempted list. This exempted list is denoted at 202, and may indicate those remote users 114 whose accesses to the host system would not result in notifications 118.

The intrusion detection component 108 may include an exemption component 204 that is generally operative to enable the host user 120 to specify that if one or more remote users 114 access the host system, then the host user 120 does not wish to receive notifications 118 resulting from those accesses. Thus, the exemption component 204 may interact with the host user 120 through a user interface, denoted for convenience but not limitation, at 122A. For example, the exemption component 204 and the host user 120 may interact through a browser interface or through any other suitable application interface.

In any event, the exemption component 204 may obtain indications of one or more exempt users 206 that are specified by the host user 120. The exempt users 206 may include one or more of an overall group of possible remote users, denoted in FIG. 2 at 114A and 114N. While FIG. 2 shows two remote users 114A and 114N, it is noted that the operating environments shown herein may include any number of possible remote users. In the example shown in FIG. 2, the exempt users 206 may include supervisors of the host user, or other remote users whom the host user is comfortable having remote accesses to the host system 102. These latter remote users may include, for example, attorneys, accountants, or other professionals in a corporate or enterprise environment.

In some instances, one or more system administrators 208 may also specify one or more exempt users using the exemption component 204. FIG. 2 denotes at 210 the exempt users specified by the system administrators 208. For example, in a corporate or enterprise environment the system administrators may specify that members of a network security team (or the like) may be exempt from having their logins or logoffs reported to the host user. Were it otherwise, the host user may be tipped off that his or her host system 102 is being audited for compliance with corporate security policies, for example. Thus, the remote users 114A and 114N may include one or more users who are exempted from reporting by one or more admins 208.

As described above with the exemptions 206 specified by the host user, the exemption component 204 and the admin 208 may interact through a user interface, denoted at 122B, in specifying the exemptions 210. However, the user interface 122B may be either on the host system 102 or the remote system 110. For example, the admin 208 may remotely login to the host system using a remote system (e.g., 110), start the exemption component 204 with admin privileges, and specify the one or more exempt users 210.

FIG. 2 shows the collective list of exempt users 206 (specified by the host user 120) and 210 (specified by the admin 208) at 212. The exemption component 204 may store list 212 of exempt users in a data store, such as the exempt list data structure 202. As shown in FIG. 2, the exempt list data structure 202 may include respective entries 214 for each remote user who is exempted by either the host user or the admin. FIG. 2 shows two entries 214A and 214M only for convenience, but the exempt list may contain any number of entries 214. While the exempt list 202 is described as a "list" herein, this reference is for illustration and example only. More specifically, these descriptions and illustrations do not limit implementations of the data structure 202 to lists, and do not exclude implementations using other types of data structures.

The entries 214A-214M may include one or more respective fields containing data pertaining to particular exempted remote users. For example, one or more user name fields 216A-216M may contain data representing a user name or other identifier by which the remote user may login to the host system 102. As detailed further below, in operation, when a remote user logs in to the host system, the user name obtained from the remote user may be run against the exempt list 202 for matches. If the user name hits in the exempt list 202, then the remote user logging in under that user name may be exempted from having his or her login reported to the host user 120.

One or more comments fields 218A-218M may store data representing any comments provided by either the host user or the admin when exempting the particular remote user. For example, these comments may indicate a position or title of the remote user, or any other commentary deemed appropriate by the host user or the admin for later reference.

One or more fields 220A-220M may indicate who designated or listed the particular remote user for exemption. For example, the field 220 may indicate whether the host user 120 or the admin 208 exempted the given remote user. In a corporate or enterprise scenario, for example, if those entries that are exempted by the admin 208 may be blocked from visibility or viewing by the host user 120 for security reasons.

The fields 216-220 in the entries 214 may be populated based on the interactions between the exemption component 204 and the host user 120 and/or the admin 208. For example, information obtained from the host user 120 and/or the admin 208 may populate the fields 216-220. Regarding the host user 120, the user names and any comments provided by the host user are denoted generally at 222. Any prompts or dialog boxes driven by the exemption component to obtain this information from the host user are denoted at 224. Regarding the admin 208, the user names and any comments provided by the admin are denoted generally at 226. Any prompts or dialog boxes driven by the exemption component to obtain this information from the host user are denoted at 228.

Figure 3:
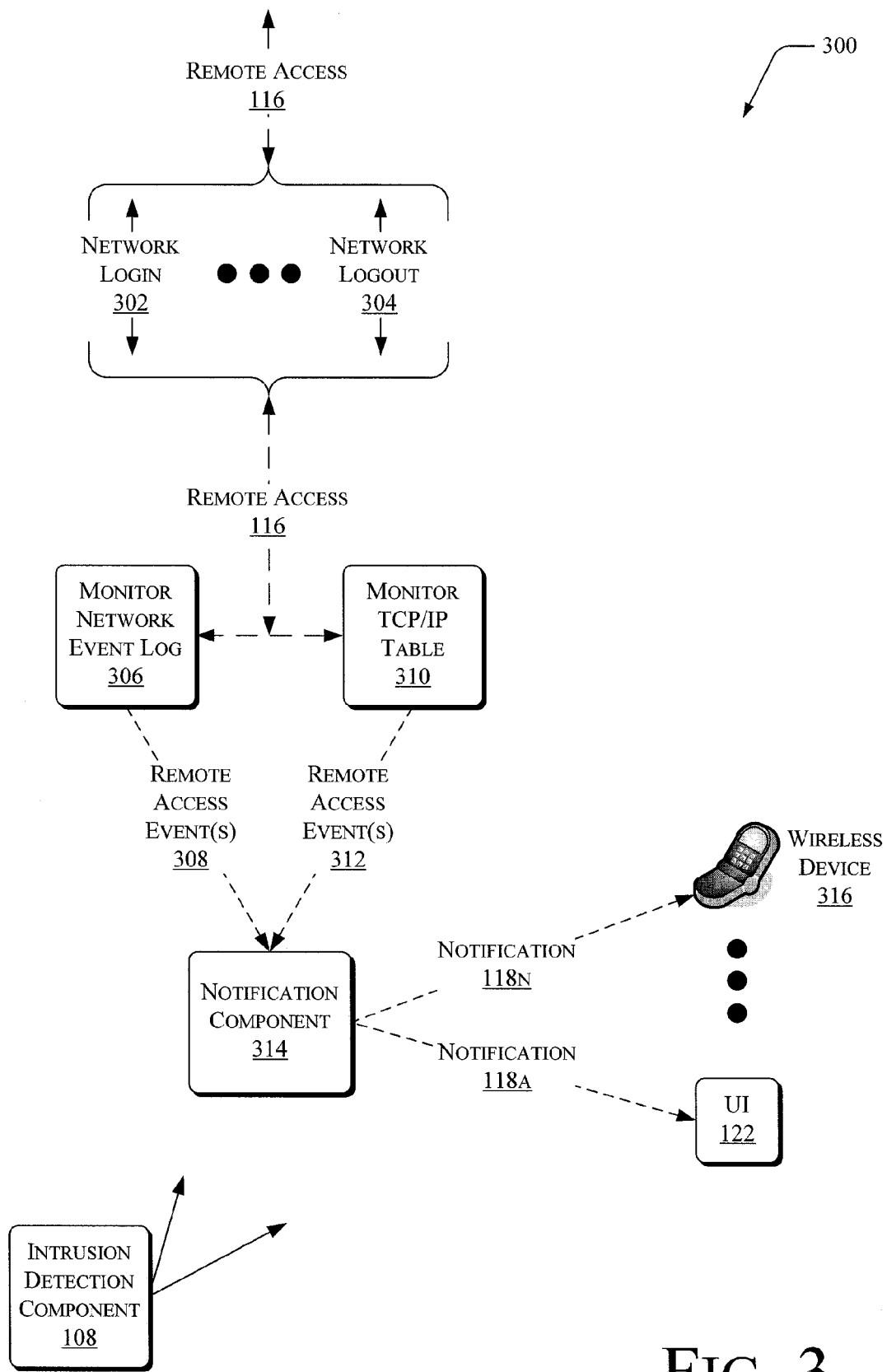
FIG. 3 is a combined block and flow diagram illustrating further components and data flows related to the intrusion detection component, pertaining to detecting events and providing notifications of the events.

Having described the exemption component and related exemption list in FIG. 2, the discussion now proceeds to a further description of the intrusion detection component, pertaining to detecting events and providing notifications of the events, now presented in FIG. 3.

FIG. 3 illustrates further components and data flows 300 related to the intrusion detection component 108, pertaining to detecting access-related events 116 and providing notifications of these events.

As described above in FIG. 1, remote access events are denoted generally at 116, and these access events are carried forward to FIG. 3, for convenience, but not limitation. For the purposes of describing FIG. 3, these events 116 may include, for example, remote logins occurring over the network 112, denoted generally at 302, and may include remote logouts occurring over the network, denoted generally at 304.

The intrusion detection component may include one or more components and/or processes that are adapted to detect these remote logins or logouts. For example, a process 306 may monitor an event log or other data store for the posting of any information indicating a login event 302 or a logout event 304. When the monitoring process 306 detects information posted in the event log, the monitoring process may generate corresponding remote access events 308.

As another example, a process 308 may monitor a network table or other data structure maintained by network adapters or other components. Such tables may reflect the status of any network connections to the host system 102. For example, the monitoring process 308 may include monitoring a TCP/IP table maintained by the host system. When the network table indicates, for example, a login event 302 or a logout event 304, the monitoring process 308 may generate corresponding remote access events 312.

The intrusion detection component may include a notification component 314 that receives the detected remote access events 308 and/or 310, and may provide notifications corresponding to these detected events. Examples of such notifications are shown in FIG. 1 at 118. For convenience, but not limitation, these notifications 118 are carried forward to FIG. 3.

The notifications 118 may be routed to a user interface (UI) provided by the host system 102, as indicated at 118A. An example of a suitable UI is shown in FIG. 1 at 122, and is carried forward to FIG. 3 for convenience only. When the UI 122 receives these notifications 118A, the UI may present a pop-up bubble or balloon indicating the type of event that was detected, and when it occurred, along with other relevant details. For example, if the notification indicates that a remote user 114 has logged in or logged out event, then the notification may include the user name associated with the login or logout event. In some instances, the user 120 may be given the option of terminating the login, and denying the remote user access to the host system 102. In other instances, the user may monitor the activities performed by the remote user.

The notifications 118 may also be routed to one or more additional devices 316. These additional devices 316 may include, for example, wireless devices to which the host user 120 has access, such as mobile phones, smart phones, pagers, wireless PDAs, or the like. Notifications sent to these additional devices are denoted at 118N, and may be tailored to the display characteristics of the additional devices. As described above with the notifications 118A, upon receiving the notifications 118N, the user 120 may deny the remote user access to the host system 102, or may allow the remote user access to the system, and monitor the remote user's activities.

Figure 4:
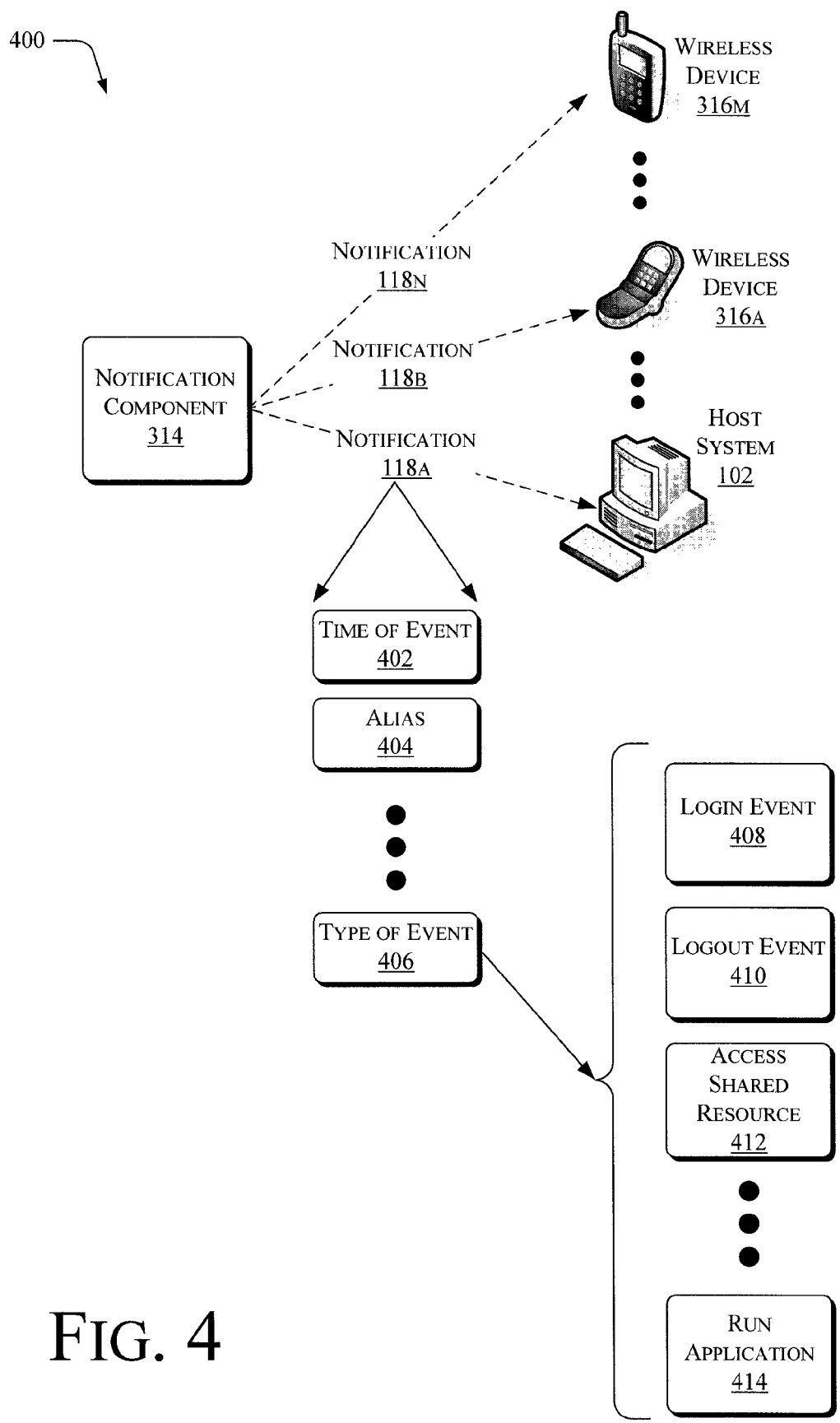
FIG. 4 is a combined block and flow diagram illustrating various types of events that may be detected and included in the notifications.

Having described the components and process flows relating to providing the notifications 118 in FIG. 3, the discussion now proceeds to a description of various types of events that may be detected and included in the notifications, now presented with FIG. 4.

FIG. 4 illustrates, denoted generally at 400, various types of events that may be detected and included in the notifications 118. For convenience, but not limitation, the notifications 118 are carried forward into FIG. 4. FIG. 4 shows three example notifications, directed respectively to the host system 102 (notification 118A), and to two additional wireless devices 316A and 316M (notifications 118B and 118M, respectively).

The host user (e.g., 120) may configure the notification component to direct the notifications 118 to one or more of the devices shown in FIG. 4, although implementations of the description herein could also direct notifications to other devices as well. For example, the user may not be in physical proximity to the host system 102, but may nevertheless want to be kept abreast with developments occurring on the host system. In such cases, if the user will have access to a wireless device (e.g., 316A or 316M), then the user may configure the notification component to direct the notifications 118 to one or more of the wireless devices 316, in addition to or instead of the host system 102.

FIG. 4 also illustrates example contents of the notifications 118. As shown in FIG. 4, the notifications may include a time field 402 indicating when the event reported in the notification occurred.

If the reported event relates to a remote user (e.g., 114), an alias field 404 may indicate a user name or other alias associated with this remote user. For example, if a remote user logs in to the host system under the user name "john.smith", then alias field 404 may contain data representing "john.smith". In this manner, the notification 118 may advise the host user 120 which remote user has logged in to the host system 102.

A field 406 may indicate a type of event reported in the notification 118. In the non-limiting examples shown in FIG. 4, login events are represented at 408, and logout events are reported at 410. In addition, block 412 represents events in which remote users access shared resources on the host system (e.g., files, directories, programs, other collections of data, or the like). Block 414 represents events in which remote users run applications made available by the host system 102.

FIG. 4 provides the foregoing examples of event types only for the convenience of illustration and description. However, it is noted that other types of events could also be represented in the notifications without departing from the scope and spirit of the description herein.

Figure 5:
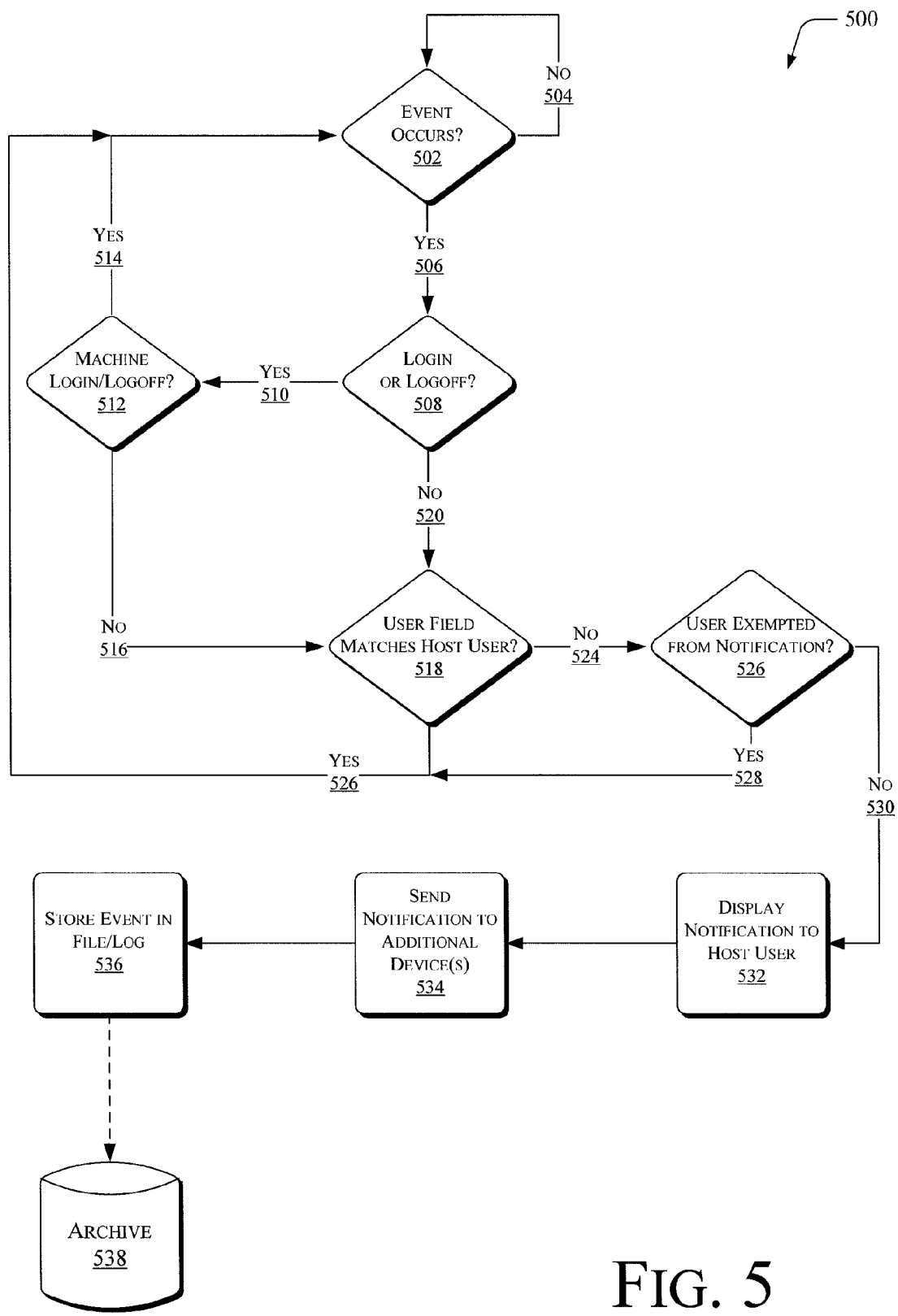
FIG. 5 is a flow diagram of an illustrative process flow for detecting network-related events and providing notifications of the same.

Having described the foregoing components and flows related to the notifications in FIG. 4, the discussion now proceeds to a description of process flows for detecting network-related events and for providing notifications of the same, now presented with FIG. 5.

FIG. 5 illustrates process flows 500 for detecting network-related events, and for providing notifications of the same. While the process flow 500 is described in connection with certain elements and components shown herein, for example, the intrusion detection component 108 and components thereof, it is noted that some or all of the process flow may be performed in connection with other components without departing from the spirit and scope of the description herein.

Block 502 represents testing whether an event related to remote accesses to the host system has occurred. Until such an event occurs, the process flow 500 may loop back to block 502 via No branch 504. When such an event occurs, the process flow 500 may take Yes branch 506 to decision block 508.

Decision block represents determining whether the event is a login or logout event. In some implementations, an operating system may assign identifiers to events that indicate the types of the events. For example, an event ID of 538 may indicate a network logon, and an event ID of 540 may indicate a network logoff, although any number of different identifier schemes may be possible.

In any event, if the detected event is a logon or logoff event, then the process flow 500 may take Yes branch 510 to decision block 512. Block 512 tests whether the login or logoff event is associated with a machine or automated process. For example, a network scanning process may be remotely logging into the host system to perform diagnostics or to collect data for status reports. Generally, such machine or automated logins or logouts may be indicated by a predefined character appearing in the user name field used in the logins or logouts. For example, the login or logout may include the '$' character in the user name field, although other techniques for indicating an automated or machine login/logout may be suitable as well.

If the login or logoff event is associated with a machine or automated process, then the process flow 500 may take Yes branch 514 to block 502. In this manner, the process flow 500 may ignore events associated with machine or automated processes, and return to block 502 to await the next detected event.

Returning to decision block 512, if the event is not associated with a machine or automated process, then the process flow 500 may take No branch 516 to decision block 518. If the event is not associated with a machine or automated process, then the event may be associated with a human remote user.

Returning to decision block 508, if the event is not a login or logoff event, then the process flow 500 may take No branch 520, also to decision block 518. In the illustrated scenario of FIG. 5, it is assumed that machine or automated processes may perform only login/logoff events. However, if this assumption does not hold true in other implementations, the process flow 500 may accommodate by altering block 508 to test for any other events, besides logins/logoffs, that the machine or automated processes may perform.

From decision block 518, if the user field associated with the event matches the user name of the host user (e.g., 120), then the process flow 500 may take Yes branch 522 back to block 502. In this manner, some implementations of the process flow 500 may ignore any events associated with the host user's user name. Thus, in some instances, the host user may choose not to be alerted when he or she remotely logs in or out of his or her own host system. However, in other implementations of the process flow 500, the host user may choose to be so alerted. For example, a remote user logging into the host system may indicate that the host user's username/password combination has been compromised, and this alert may prompt the host user to begin an investigation and take additional precautions, such as disabling the compromised username and password.

Returning to decision block 518, if the user field associated with the event does not match the user name of the host user, then the process flow 500 may take No branch 524 to decision block 526.

Decision block 526 represents testing whether the remote user is exempted from having his or her events reported to the host user. Recalling FIG. 2, the host user 120 and/or the admin 208 may specify one or more remote users 114 whose accesses are exempt from being reported to the host user. Thus, block 526 may include accessing a date store, such as the exempt list 202 shown in FIG. 2, to determine whether the remote user is exempt.

From decision block 526, if the remote user is exempt from reporting, then the process flow 500 may take Yes branch 528 to return to block 502 to await the next event. In this manner, the process flow 500 may ignore any events associated with exempt remote users. In some implementations, these exempt accesses may be logged, but without providing notifications to the host user.

Returning to decision block 526, if the remote user is not exempt from reporting, then the process flow 500 may take No branch 530 to block 532. Block 532 represents displaying one or more notifications (e.g., 118) to the host user. These notifications may be related to the detected events, and may take the form of graphic balloons or bubbles presented in, for example, a system "tray" portion of a user interface (e.g., 122) included in the host system. The host user may then act on these notifications as appropriate. As described above, the host user may interact with these balloons or bubbles so as to, for example, reject a given login, thereby booting the remote user from the host system.

Block 534 represents sending a notification to one or more additional devices, besides the host system 102. Recalling FIGS. 3 and 4, examples of such additional devices may include, but are not limited to, the wireless devices shown at 316. In this manner, the process flow 500 may alert the host user, even if the host user is away from the host system.

Block 536 represents storing the detected event in an archive, file, or log for later access and review. FIG. 5 shows an example of a suitable archive at 538.

Having described the process flows 500 for detecting network-related events, and for providing notifications of the same, the discussion now turns to a more detailed description of illustrative records and fields that the archive may contain, now presented in FIG. 6.

FIG. 6 illustrates examples of entries and fields, collectively 600, that may be stored in an archive that is written in the course of detecting network-related events and providing notifications of the same. FIG. 5 shows an example archive at 538, and this reference number is carried forward, only for convenience, to FIG. 6.

As shown in FIG. 6, the archive may include a respective record or entry for each network-related event detected by, for example, an intrusion detection component (e.g., 108). In some instances, a record or entry for the event may be archived whether or not the user is notified of the event. In other instances, the record or entry for the event may be archived only if the user is notified of the event. In any case, FIG. 6 shows two example entries 602A and 602P (collectively, entries 602), but the archive may contain any number of entries. The entry 602A corresponds to a first event, and the second entry 602P corresponds to a second event.

The entries 602 may include one or more of the example fields shown in FIG. 6. Respective time fields 604A and 604P may indicate when given events occurred, or when the entries 602 were archived. Respective type fields 606A and 606P may indicate what type of event occurred or was detected. As shown in FIG. 6, the events may include: login events, represented at 608; logout or logoff events, represented at 610; accesses to some shared resource on the host system, represented at 612; executions of applications on the host system, represented at 614; or the like.

Respective fields 616A and 616P may contain identifiers indicating which remote user was involved in various different events represented in the entries 602. In this manner, the host user or other interested persons or processes may review the archive 538, and determine who has accessed the host system remotely.

Fields 618A and 618P may indicate whether the corresponding entries 602A and 602P are to be blocked from review by the host user. For example, if one or more of the entries 602 result from network accesses relating to security audits or investigations, then a security team may wish to withhold this information from the host user. The archive 538 may implement the fields 618 as binary or flag fields, such that if the fields 618 are "set", the entries 602 may not be viewed by anyone who does not have the requisite privileges.

Fields 620A and 620P may indicate whether the host user was notified of the event represented in the corresponding entries 602. For example, the remote users involved in the various events may have been exempt users (e.g., 206, 210, and 212 in FIG. 2) at the time that the events occurred. These remote users may have been exempted by the host user or by an administrator. As noted above, those entries that result from accesses by remote users who were exempted by the admins may have their blocking fields 618 set, such that the host user may not access the entries. Except for these admin-exempted accesses, the host user may query the archive to determine which accesses did not result in notifications. Based on the results of these queries, the host user may Choose to exempt or de-exempt certain remote users.

Additionally, the host user may be able to audit the archive, for example, to discover which remote users have reviewed a shared resource on the host system, and when they reviewed the shared resource. For example, the host user may place a document in a shared network folder, and thereby make that document available to remote users. Using the tools and techniques described herein, the archive may indicate which remote users reviewed this document and when. Afterwards, the archive may provide evidence refuting any assertions from the remote users that they did not review the document.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. A computer-readable storage medium comprising machine-readable instructions that, when executed by the machine, cause the machine to perform a method comprising:
   receiving at least one indication of an occurrence of at least one remote access event, wherein the remote access event is related to a network access to the machine from a first user remote from the machine;
   determining whether, in response to the indication, to send at least one notification to a second user, wherein the second user is authorized to use the machine;
   if the determining step determines that the at least one notification is to be sent to the second user, providing the at least one notification to the second user; and
   tracking the occurrence of the at least one remote access event in response to the providing the at least one notification to the second user.

2. The computer-readable storage medium of claim 1, wherein the instructions for receiving the at least one indication of an occurrence of at least one remote access event include instructions for receiving at least one indication of the first user logging into the machine.

3. The computer-readable storage medium of claim 1, wherein the instructions for receiving the at least one indication of an occurrence of at least one remote access event include instructions for receiving at least one indication of the first user logging out of the machine.

4. The computer-readable storage medium of claim 1, wherein the instructions for receiving the at least one indication of an occurrence of at least one remote access event include instructions for receiving at least one indication of the first user accessing at least one shared resource on the machine.

5. The computer-readable storage medium of claim 1, wherein the instructions for receiving the at least one indication of an occurrence of at least one remote access event include instructions for receiving at least one indication of the first user running at least one application on the machine.

6. The computer-readable storage medium of claim 1, wherein the instructions for providing the at least one notification include instructions for providing the notification to the machine.

7. The computer-readable storage medium of claim 1, wherein the instructions for providing the at least one notification include instructions for providing the notification to at least one additional device indicated by the second user.

8. The computer-readable storage medium of claim 1, wherein the instructions for providing the at least one notification include instructions for indicating a time at which the remote access event occurred.

9. The computer-readable storage medium of claim 1, wherein the instructions for providing the at least one notification include instructions for indicating a user name of the first user.

10. The computer-readable storage medium of claim 1, wherein the instructions for providing the at least one notification include instructions for indicating a type of the remote access event.

11. A computer implemented method of performing detection and notification of network-related events, the method comprising:
    detecting an occurrence of at least one event related to at least one remote access to a host system by a first user, wherein the remote access occurs over a network;
    determining whether, in response to the detection, to send at least one notification to a second user, wherein the second user is authorized to use the host system, wherein determining comprises determining whether the first user is exempted from having the event reported to the second user;
    if the at least one notification should be sent to the second user, providing the at least one notification to the second user; and
    tracking the occurrence of the at least one event in response to the providing the at least one notification to the second user.

12. The computer implemented method of claim 11, further comprising determining whether the at least one event is associated with an automated process.

13. The computer implemented method of claim 11, further comprising determining whether a user field associated with the at least one event occurs in a data store containing data representing at least one user.

14. An apparatus for detecting and notifying of network-related events, the apparatus comprising:

a computer processor for executing computer executable instructions; and at least one computer storage medium storing computer executable instructions that when executed by the computer processor provide for:

receiving at least one indication of an occurrence of at least one remote access event, wherein the remote access event is related to a network access to the machine from a first user remote from the machine;

determining whether, in response to the indication, to send at least one notification to a second user, wherein the second user is authorized to use the machine, wherein the determining step comprises determining whether the first user is exempted from having the event reported to the second user;

if the at least one notification should be sent to the second user, providing the at least one notification to the second user; and tracking the occurrence of the at least one remote access event in response to the providing the at least one notification to the second user.

15. The apparatus of claim 14, wherein the receiving the at least one indication of an occurrence of at least one remote access event comprises receiving at least one indication of the first user logging into the machine.

16. The apparatus of claim 14, wherein the receiving the at least one indication of an occurrence of at least one remote access event comprises receiving at least one indication of the first user logging out of the machine.

17. The apparatus of claim 14, wherein the receiving the at least one indication of an occurrence of at least one remote access event comprises receiving at least one indication of the first user accessing at least one shared resource on the machine.

18. The apparatus of claim 14, wherein the receiving the at least one indication of an occurrence of at least one remote access event comprises receiving at least one indication of the first user running at least one application on the machine.

19. The apparatus of claim 14, wherein the providing the at least one notification comprises indicating a time at which the remote access event occurred.

20. The apparatus of claim 14, wherein the providing the at least one notification comprises indicating a type of the remote access event.

* * * * *